US006457353B1

(12) United States Patent
Kanke et al.

(10) Patent No.: US 6,457,353 B1
(45) Date of Patent: Oct. 1, 2002

(54) APPARATUS OF DIAGNOSING AN INTERNAL COMBUSTION ENGINE AND A METHOD OF DIAGNOSING OF AN INTERNAL COMBUSTION ENGINE

(75) Inventors: Atsushi Kanke, Hitachi; Minoru Ohsuga; Kenji Ohta, both of Hitachinaka, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/480,693

(22) Filed: Jan. 11, 2000

(30) Foreign Application Priority Data

Jan. 11, 1999 (JP) .......................................... 11-003678

(51) Int. Cl.[7] .......................... G01L 3/26; G01M 19/00

(52) U.S. Cl. ..................................... 73/117.3; 73/118.2

(58) Field of Search .......................... 123/90.15, 90.16; 73/116, 117.3, 118.2

(56) References Cited

U.S. PATENT DOCUMENTS 5,495,830 A * 3/1996 Wu ........................ 123/90.15
5,549,080 A * 8/1996 Uchikawa ................ 123/90.16

FOREIGN PATENT DOCUMENTS

| | | |
|---|---|---|
| JP | 4-91330 | 3/1992 |
| JP | 6-317115 | 11/1994 |
| JP | 6-317117 | 11/1994 |
| JP | 7-293287 | 11/1995 |
| JP | 11-218036 | 8/1999 |

* cited by examiner

*Primary Examiner*—Benjamin R. Fuller
*Assistant Examiner*—Maurice Stevens
(74) *Attorney, Agent, or Firm*—Crowell & Moring LLP

(57) ABSTRACT

By employing command value signals for controlling the opening timing of an exhaust valve or an intake valve and means for measuring flow rates of an intake air of a flow direction which flows through an intake manifold of an internal combustion engine, an air flow rate corresponding to the command value signal is measured. A valve mechanism includes the intake valve and the exhaust valve for each cylinder of the internal combustion engine and is controlled by a valve control means for controlling the valve mechanism. A failure diagnosis of an operating status of the valve mechanism can be performed.

12 Claims, 14 Drawing Sheets

63
I/O
A/D CONV.
632
631
30
Pin
Vout
225
224
220
I/O
D/A CONV.
20
PROCESSING CIRCUIT
222
REWRITABLE MEMORY
223
A/D CONV.
221
Vcc
203
POWER SUPPLY CIRCUIT
Vref
Vbi
Vin
210
SENSOR CIRCUIT
VB
201
Rh1
211
Rc1
212

APPARATUS OF DIAGNOSING AN INTERNAL COMBUSTION ENGINE AND A METHOD OF DIAGNOSING OF AN INTERNAL COMBUSTION ENGINE

BACKGROUND OF THE INVENTION

1. Field of the Invention

The present invention relates to an apparatus of diagnosing an internal combustion engine and a method of diagnosing an internal combustion engine and, in particular to an apparatus of diagnosing an internal combustion engine and a method of diagnosing an internal combustion engine wherein the internal combustion engine diagnosis apparatus has a valve mechanism in which a timing of the valve mechanism has a variable timing.

2. Prior Art

Japanese application patent laid-open publication No. Hei 4-91330 (1992) has disclosed an internal combustion engine apparatus for discriminating a variable timing control unit for troubles according to a difference between rotational speeds of an internal combustion engine by ON and OFF commands on a solenoid that varies the valve opening/closing timing.

Japanese application patent laid-open publication No. Hei 6-317115 (1994) has disclosed another internal combustion engine apparatus for judging a variable timing control unit for troubles by obtaining an output fluctuation from an engine rotation signal, controlling to turn off the variable valve timing controlling solenoid, and calculating the relationship between the output fluctuation and the overlap quantity of the intake valve and the exhaust valve.

Japanese application patent laid-open publication No. Hei 6-317117 (1994) has disclosed another internal combustion engine apparatus for judging a variable timing control unit for troubles by judging ON and OFF states of the variable valve timing controlling solenoid and comparing the pulsating level of the engine intake air which is actually measured by a preset pulsating level for the running condition.

Further, Japanese application patent laid-open publication No. Hei 7-293287 (1995) has disclosed another internal combustion engine apparatus for judging a variable timing control unit for troubles by judging ON and OFF states of the variable valve timing controlling solenoid and comparing the pulsating cycle of the engine intake air which is actually measured by a preset pulsating cycle for the running condition.

The above stated conventional internal combustion engine apparatuses for judging a variable timing control unit for troubles have had a difficulty in judging for troubles in various modes in which the intake valve and the exhaust valve overlap condition with each other while the valve mechanism is controlled not only by the intake valve but also by the exhaust valve.

SUMMARY OF THE INVENTION

An object of the present invention is to provide an apparatus of diagnosing an internal combustion engine and a method of diagnosing an internal combustion engine wherein a cycle efficiency of the internal combustion engine can be improved.

Another object of the present invention is to provide an apparatus of diagnosing an internal combustion engine and a method of diagnosing an internal combustion engine wherein a reliability of a control unit of the internal combustion engine can be assured.

A further object of the present invention is to provide an apparatus of diagnosing an internal combustion engine and a method of diagnosing an internal combustion engine wherein for trouble diagnosing a control unit of the internal combustion engine the apparatus has a valve mechanism to improve its cycle efficiency and assuring the reliability of the control unit.

The above stated objects of the present invention can be attained by an apparatus of diagnosing an internal combustion engine in which an intake valve or an exhaust valve opens and closes each cylinder of the internal combustion engine by electric signals, an abnormality in a valve mechanism and a control apparatus of the valve mechanism is diagnosed in accordance with a quantity of a backward flow which flows into an intake manifold of the internal combustion engine and an overlap open time period between the intake valve and the exhaust valve or an abnormality of a valve mechanism and a control apparatus of the valve mechanism is diagnosed in accordance with a quantity of a backward flow which flows into an intake manifold of the internal combustion engine and a preset target EGR quantity of the internal combustion engine.

The above stated objects of the present invention can be attained by an apparatus of diagnosing an internal combustion engine in which an intake valve or an exhaust valve opens and closes each cylinder of the internal combustion engine by electric signals, an abnormality in a valve mechanism and a control apparatus of the valve mechanism is diagnosed in accordance with a quantity of a backward flow which flows into an intake manifold of the internal combustion engine, an overlap open time period between the intake valve and the exhaust valve, and a rotational speed of the internal combustion engine.

The above stated objects of the present invention can be attained by a method of diagnosing an internal combustion engine in which an intake valve or an exhaust valve opens and closes each cylinder of the internal combustion engine by electric signals, the internal combustion engine diagnosis method includes steps, a first step of diagnosing an abnormality in accordance with an overlap open time period between the intake valve and the exhaust valve and a backward flow time period (Tbi) of the intake manifold of the internal combustion engine, and a second step of diagnosing an abnormality in accordance with a target EGR quantity of the internal combustion engine and a mass of a backward flow air (Qbi) in the intake manifold of the internal combustion engine.

The above stated objects of the present invention can be attained by a method of diagnosing an internal combustion engine in which an intake valve or an exhaust valve opens and closes each cylinder of the internal combustion engine by electric signals, the internal combustion engine diagnosis method includes steps, a first step of diagnosing an abnormality in accordance with an overlap open time period between the intake valve and the exhaust valve, and a ratio (Tn1/Tb2) of a forward air flow time period (Tn1) to a backward flow time period (Tb2) of the intake manifold of the internal combustion engine, and a second step of diagnosing an abnormality in accordance with a target EGR quantity of the internal combustion engine and a ratio (dn/un) of a peak forward flow air mass (dn) to a peak backward flow air mass (un).

DESCRIPTION OF THE INVENTION:

One embodiment of an apparatus of diagnosing an internal combustion engine and a method of diagnosing an internal combustion engine according to the present invention will be explained referring to drawings.

The internal combustion engine in accordance with this embodiment according to the present invention uses a variable valve timing to perform lean burn control at a light-load time, adjustment of the quantity of an exhaust gas remaining in a cylinder of the engine while the valve is open, adjustment of the air compression ratio, and knocking suppression control, combustion pressure control, rotational speed control, fuel injection control as an air quantity increases or in-cylinder pressure control to even air pressures in the cylinders of the engine.

Figure 1:
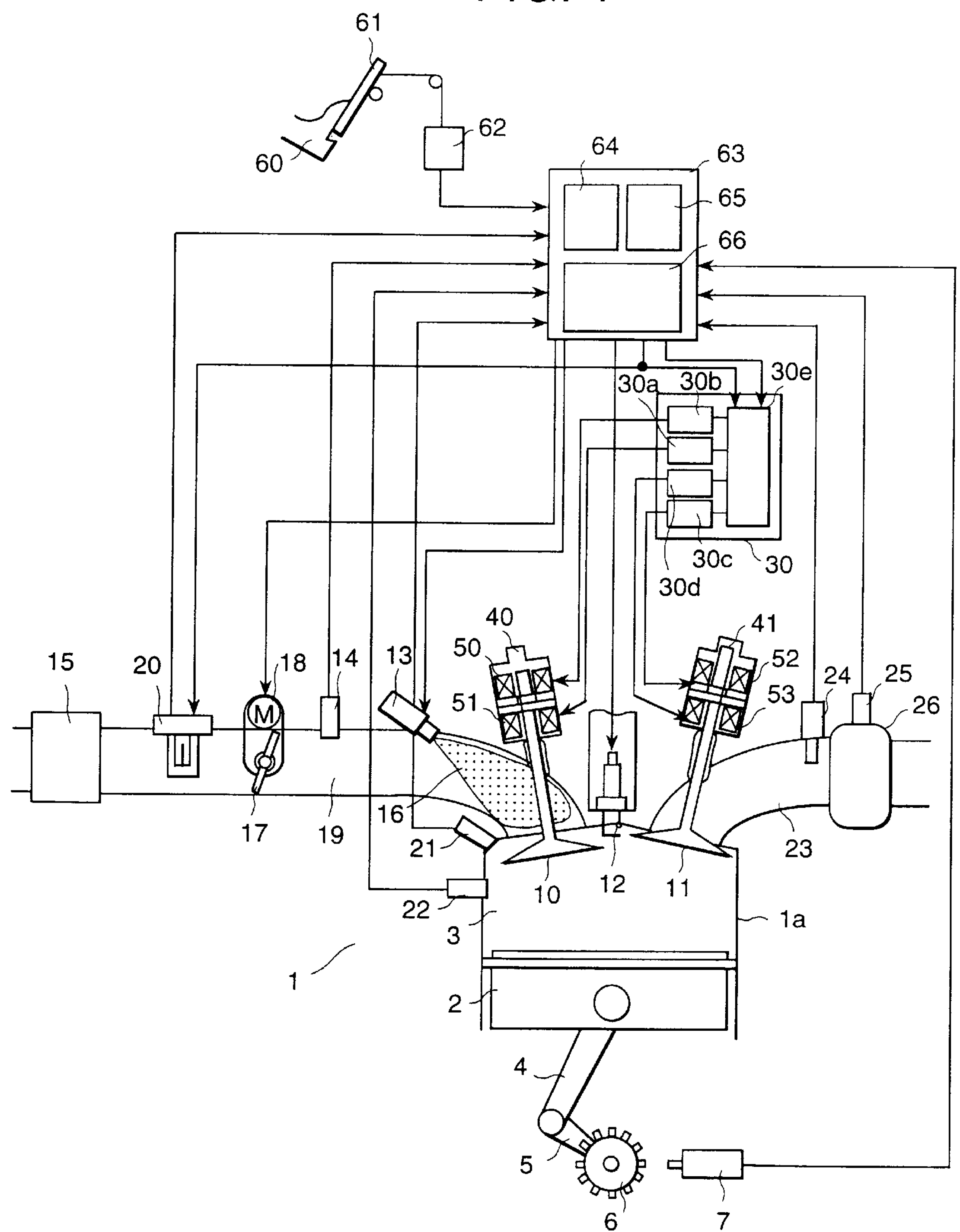
FIG. 1 is a schematic diagram of a system using a valve mechanism of an apparatus of diagnosing an internal combustion engine and a method of diagnosing an internal combustion engine of one embodiment according to the present invention.

The internal combustion engine 1 shown in FIG. 1 has a crank mechanism comprising of a connecting rod 4 and a crankshaft 5. A combustion chamber 3 is formed with a piston 2 connected to the crank mechanism and an engine head 8 of the engine 1 and hermetically closed by an intake valve 10, an exhaust valve 11, and an ignition plug 12 on the engine head 8. The piston 2 is received in a cylinder 1_a_ of the engine 1.

The intake valve 10 and the exhaust valve 11 are respectively driven by the variable valve mechanisms 40 and 41. The engine 1 takes the air required for combustion into the combustion chamber 3 by the operation of the throttle valve 17 and the reciprocal movement of the piston 2. The throttle valve 17 is operated in accordance with an electronic throttle valve controlling motor 18. The air is filtered clean by an air cleaner 15 before being taken into the combustion chamber 3 and measured by an air flow meter 20. This quantity of the intake air is used for calculation of the quantity of fuel to be injected.

When the throttle valve 17 opens a little, the air pressures in the combustion chamber 3 and in an intake port 19 in a downstream side of the throttle valve 17 are lower than the atmospheric pressure. A pressure sensor 14 in the intake manifold always measures the air pressure in the intake manifold and the result thereof is used to control the engine 1.

A control unit 63 for controlling the engine 1 is comprised of a running status detecting means 64 for detecting the running status of the engine 1 according to signals from the various sensors, a variable valve controlling means 30 for controlling the variable valve mechanisms 40 and 41 on the engine 1, and a fuel injection controlling means for controlling the quantity of fuel to be injected from the injector 13 and a fuel injection timing.

When a driver 60 of a vehicle having this internal combustion engine 1 steps on the accelerator pedal 61, the movement of the pedal 61 is converted into an electric signal by the potentiometer 62 and the electric signal is fed to a running status detecting means 64 in the control unit 63.

The running status detecting means 64 receives other signals from a crank angle sensors which is comprised of components 6 and 7 mounted on the crankshaft 5, from the above stated air flow meter 20, from a pressure sensor 14 in the intake manifold, from an air-fuel ratio sensor 24 provided in the intake manifold, from a temperature sensor 25 for detecting the temperature of the exhaust catalyst 26 in an exhaust port 23, from a pressure sensor 21 which is provided in the combustion chamber 3 and detects a pressure in the combustion chamber 3, and a knocking sensor 22 for detecting knockings.

The variable valve controlling means 30 receives the signals from the running status detecting means 64 and outputs control signals to the variable valve mechanism 40 which drives the intake valve 10 and to the electronically controlled throttle valve drive motor 18 which drives the throttle valve 17 to control the quantity of air taken into the engine 1. The fuel injection control means 66 receives the signals from the running status detecting means 64, and outputs a control signal to the fuel injector 13 to control the quantity of fuel to be injected and the fuel injection timing.

Although the diagnosis apparatus of the internal combustion engine of this embodiment according to the present invention uses rectangular valve lift value shapes of the intake valve 10 and the exhaust valve 11, the similar effect can be obtained by using trapezoidal valve-lift value shapes which can reduce the valve opening/closing operating speeds.

Figure 2:
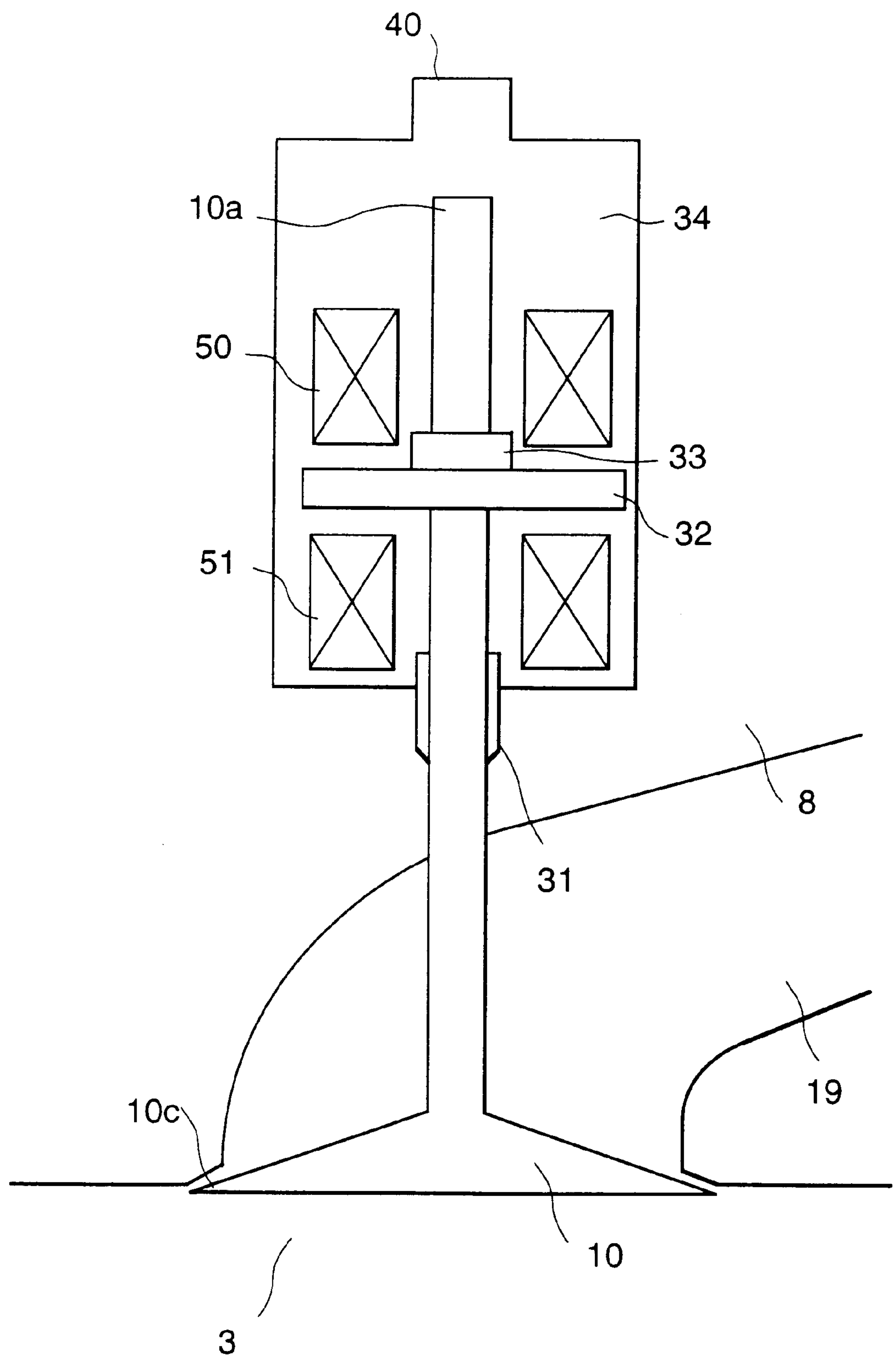
FIG. 2 is a magnified view of a part of shown in the valve mechanism of FIG. 1.

The variable valve mechanism 40 of the engine diagnosis apparatus of the internal combustion engine 1 of this embodiment according to the present invention will be explained in detail referring to FIG. 2. The intake valve 10 can move along a valve guide 31 mounted on the engine head 8. A stem 10*a* of the intake valve 10 has a plate 32 which can be attracted by the electromagnetic means 50 and 51 and a member 33 for fixing the plate 32 to the stem 10*a* of the intake valve.

When the control unit 63 shown in FIG. 1 sends a control signal to the electromagnetic means 50 or 51, the plate 32 is electromagnetically attracted to the electromagnetic means 50 or 51 to open or close the intake valve 10. In other words, to open the intake valve 10, the control unit 63 feeds a control signal to the electromagnetic means 50 and consequently the plate 32 is attracted to the electromagnetic means 50.

The valve head 10*c* of the intake valve 10 goes away from a valve seat on the engine head 8. As the result, an intake port 19 opens to the combustion chamber 3 and lets the air go into the combustion chamber 3. While the intake valve 10 is open, the signal remains fed to the electromagnetic means 51 and the plate 32 remains attracted to the electromagnetic means 51.

Accordingly, the intake valve 10 retains a preset valve lift close to the maximum valve lift. To close the intake valve 10, the control unit 63 stops feeding the signal to the electromagnetic means 50 and starts feeding the signal to the electromagnetic means 51. The plate 32 is attracted to the electromagnetic means 51. As the result, the valve head 1O*c* of the intake valve 10 comes in close contact with the valve seat and the intake port 19 is shut away from the combustion chamber 3. Thus the air supply to the combustion chamber 3 is complete.

In the diagnosis apparatus of the internal combustion engine 1 of this embodiment according to the present invention shown in FIG. 1, the intake valve 10 starts to open before the exhaust valve 11 closes at a crank angle of 85 degrees and immediately gets a preset valve lift close to or equal to the maximum valve lift and retains the valve lift for a preset time period. In general designing of the engine diagnosis apparatus, the maximum valve lift of the intake valve 10 is greater than that of the exhaust valve 11.

Figure 3:
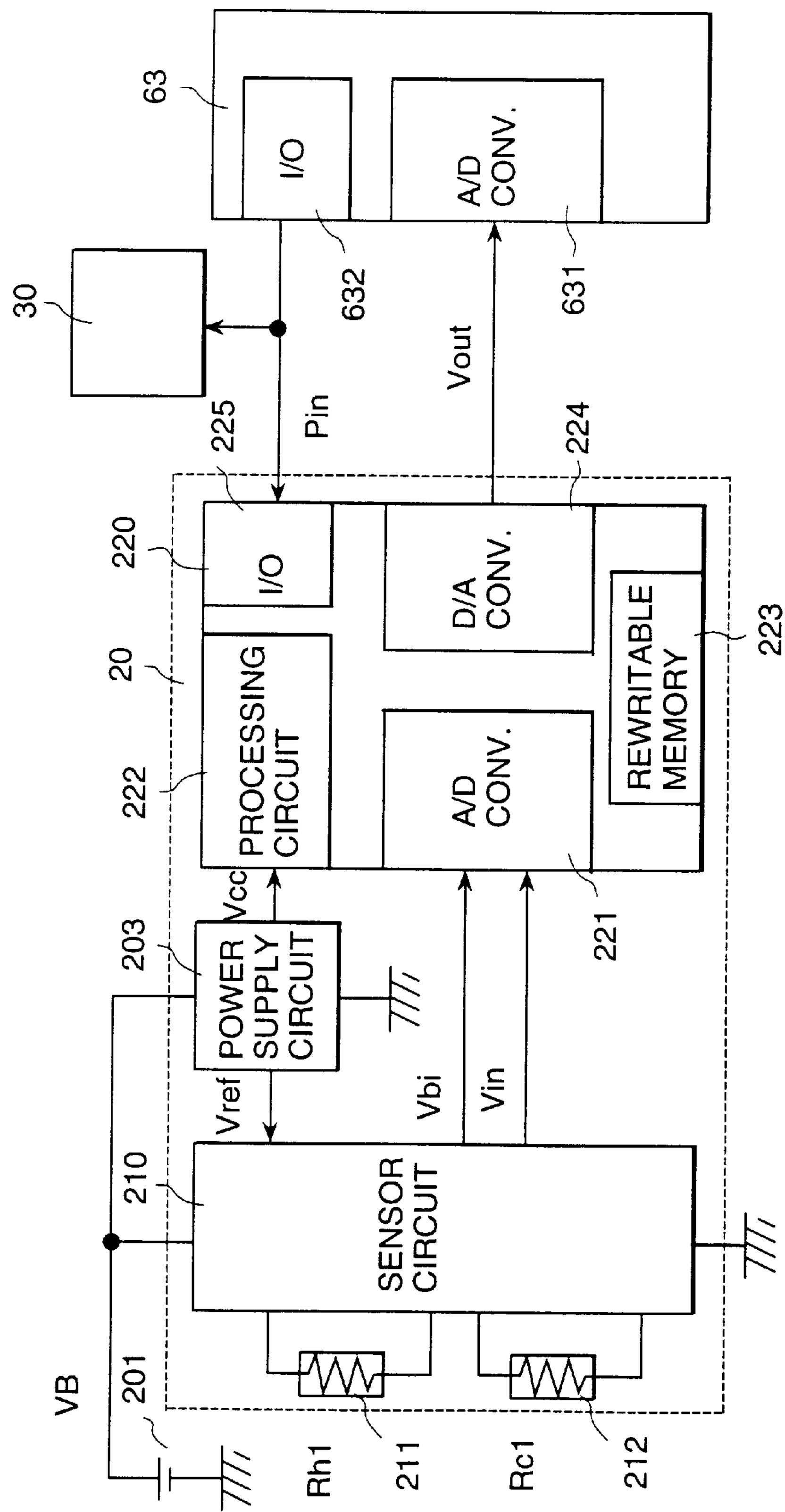
FIG. 3 is a functional block diagram showing a sensor system of a first embodiment according to the present invention.
Figure 4:
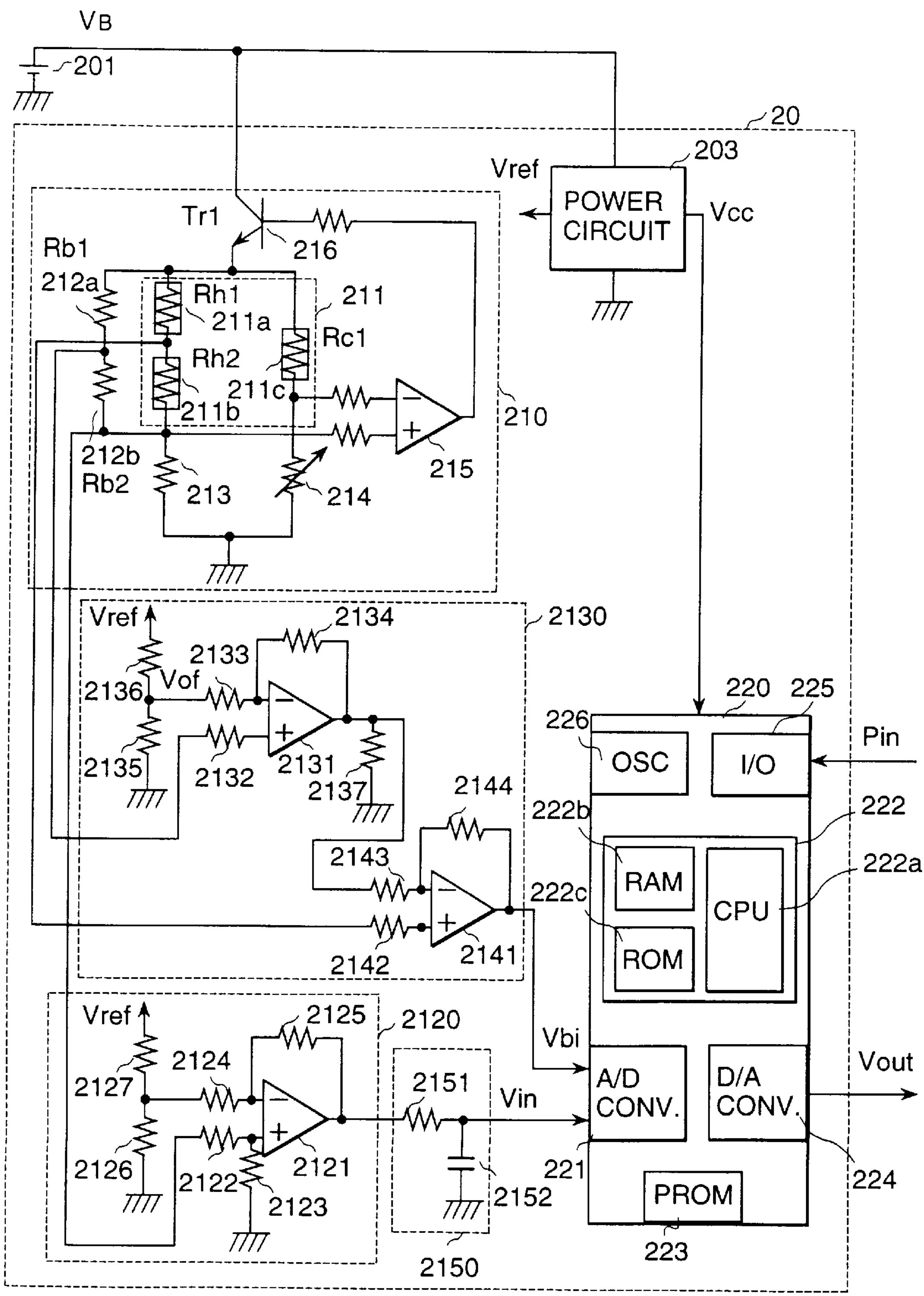
FIG. 4 is a circuit diagram showing an air flow meter which is the first embodiment according to the present invention.

Below will be explained the construction of an air flow meter 20 used to diagnose the variable valve mechanism 40 of one of the embodiments according to the present invention, referring to FIG. 3. A sensor circuit 210 connected to a power supply 201 constitutes a sensing part of the thermal air flow meter 20 which heats the heating resistor 211 to keep it at a preset temperature and measures the flow rate of air flowing over the heating resistor 211 from heat loss corresponding to the velocity of the air.

The error correction unit equipped with a micro-processor 220 receives signals Vin and Vbi from the sensor circuit 210, converts them into digital values by the analog-to-digital converter (A/D converter) 221, corrects the values by the processing circuit 222 according to the correction data stored in a rewritable memory 223, converts the values to have the same voltage values as those of the sensor circuit 210 by the digital-to-analog converter (D/A converter), then outputs the result to the control unit 63 of the engine 1. The error correcting unit comprising of the sensor circuit 210, the micro-processor 220 and the power supply circuit 203 which generates a reference voltage constitutes the air flow meter 20.

The engine control unit 63 receives a signal Vout from the air flow meter 20, converts it into a digital value by the analog-to-digital converter (A/D converter) 631 and uses the result for engine control. At the same time, the engine control unit 63 sends a control signal from the I/O terminal (I/O) 225 to the variable valve controlling means 30 and a variable valve control timing to the I/O terminal (I/O) 225 of the micro-processor 220, which also enables the air flow meter 20 to grasp the operating status of the variable valve mechanism and to trouble diagnose. The control signal can be any of a signal which directly controls the valve timing and a control command value which is transferred as pulse like amplitude data.

Below will be explained the detailed construction of hardware of the embodiment according to the present invention. The sensor circuit 210 connected to the power supply 201 outputs a signal proportional to an air flow rate. The sensor circuit 210 is comprised of a Wheatstone bridge having heating resistors (exothermal resistors or heating conductors) 211*a* and 211*b*, a temperature compensating resistor 211*c*, and resistors 213 and 214, a differential amplifier 215, and a transistor 216.

The current flowing through the heating resistors 211*a* and 211*b* is controlled by the differential amplifier 215 and the transistor 216 so that the potential difference at the center of the bridge may be zero. This construction controls to keep the resistances of the resistors 211*a* and 211*b* constant in regardless of the largeness of the air flow velocity, namely to keep the resistors 211*a* and 211*b* at a preset temperature. A signal indicating an air flow rate which is determined by the heating resistors 211*a* and 211*b* is fed to a zero-span circuit 2120 which is comprised of a differential amplifier 2121, and resistors 2122, 2123, 2124, 2125, 2126, and 2127.

A direction detection signal Vbi representing the direction of an air flow is obtained by the heating resistors 211*a* and 211*b*, the resistors 212*a* and 212*b* of the bridge circuit which are placed in parallel along to the flow of the air and by a direction detection circuit 2130 comprising of differential amplifiers 2131 and 2141 and resistors 2132, 2133, 2134, 2135, 2136, and 2142, 2143, and 2144.

The above stated heating resistors 211*a* and 211*b* are made of a thin or thick heat generating film of a compound of metal such as platinum, nickel, or tungsten or a poly-silicone resistor on a substrate such as a glass, ceramic, or silicone plate.

For the use of some kinds of heating resistors, there may be a phase difference between the direction signal Vbi and the output of the zero-span circuit 2120 due to a thermal response delay when the air flow changes its direction. A voltage output Vin without a phase difference can be obtained for example by adding a phase delay circuit 2150 comprising of a resistor 2151 and a capacitor 2152. This example uses a primary filter as a phase delay circuit, but it is possible to make a phase delay by adding a capacitor in parallel to the resistor 2125 of the zero-span circuit 2120.

The above stated heating resistors 211*a* and 211*b* are provided in the intake manifold of the internal combustion engine 1 of a vehicle or the like and outputs a voltage proportional to the flow rate of air moving or air flowing through the intake air passage in the form of a voltage output Vin of the differential amplifier 2121.

This output voltage Vin is fed to an analog-to-digital converter 221 built in the micro-processor 220, converted into a digital signal, and operated into an air flow rate by the CPU 222 in the micro-processor 220 according to the output-voltage vs air flow rate formula. The result undergoes error corrections and digital-to-analog conversion by the digital-to-analog converter 224, and output as a voltage value to the engine control unit and the like.

The other components of the micro-processor 220 are a non-volatile memory (ROM) 222*c* storing flow-rate maps and programs, a rewritable memory (PROM) 223 storing individual difference information such as data of fluctuation of resistances of the heating resistors 211*a* and 211*b*, a random access memory (RAM) 222*b* to be used as a working area of the CPU 222*a*, an oscillator (OSC) 226 which generates an internal clock, and I/O terminals (I/O) 225.

The rewritable memory (PROM) 223 needs not be built in the micro-processor 220. It can be ROM of the fuse type, electrically erasable ROM (EEPROM), a flash memory which can be cleared at once, or fast non-volatile memory using polarization characteristics of ferrodielectric films as far as its storage capacity is enough for one writing.

Figure 5:
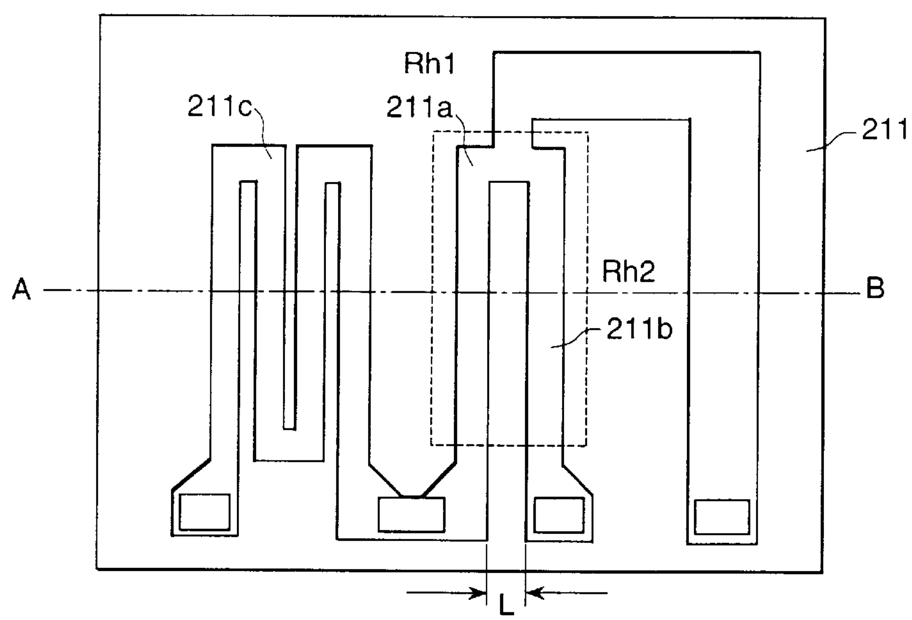
FIG. 5 shows a pattern showing the heating resistor element of one embodiment according to the present invention.

Next, the characteristics of the heating resistors 211*a* and 211*b* will be explained below referring to FIG. 5 which shows an example of heating resistors 211*a* and 211*b*. This example has poly-silicone resistor elements on the flat silicone substrate 211. The heating resistors 211*a* and 211*b* are placed in parallel with each other on the silicone substrate 211 and a voltage for a bridge circuit is taken in from the mid-point of the resistors 211*a* and 211*b*. This silicone substrate 211 also has a temperature compensating resistor 211*c* on it.

Figure 6:
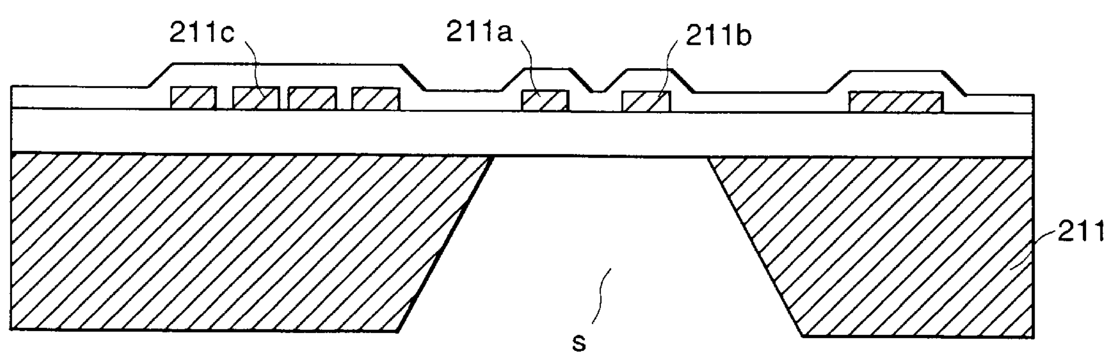
FIG. 6 is a cross-sectional view of the heating resistor element of one embodiment according to the present invention.

The most significant thing to detect the direction of air flow is the distance L between the heating resistors 211*a* and 211*b* which are placed in parallel with each other. Referring to FIG. 6 which shows a cross-sectional view of this sensing unit, the silicone substrate 211 is etched off to provide a space s under the heating resistors 211*a* and 211*b*, which thermally easily insulates the heating resistors 211*a* and 211*b* from each other and improves the response to the air flow.

Figure 7:
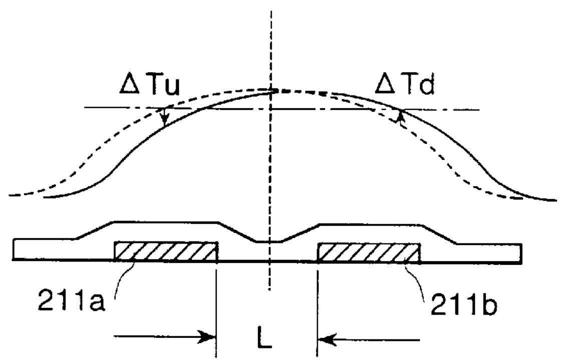
FIG. 7 is an explanatory view showing heating temperature of a heating resistor unit of one embodiment according to the present invention.

FIG. 7 shows a temperature distribution of the heating resistors 211*a* and 211*b* assuming that the air flows from a direction A to a direction B on the silicone substrate 211. Although the heating resistors 211*a* and 211*b* are heated evenly, but the heating resistor 211*b* in the downstream side of the air flow becomes a little hotter than the heating resistor 211*a* in the upstream side.

This temperature difference becomes greater as the distance L between the heating resistors 211*a* and 211*b* becomes wider and the sensitivity of the bridge circuit becomes higher. However, this increases a thermal delay as more areas must be heated up. This embodiment according to the present invention can obtain an exact flow rate signal proportional to the air flow even when the distance L is wide enough to assure the sensitivity.

Figure 8:
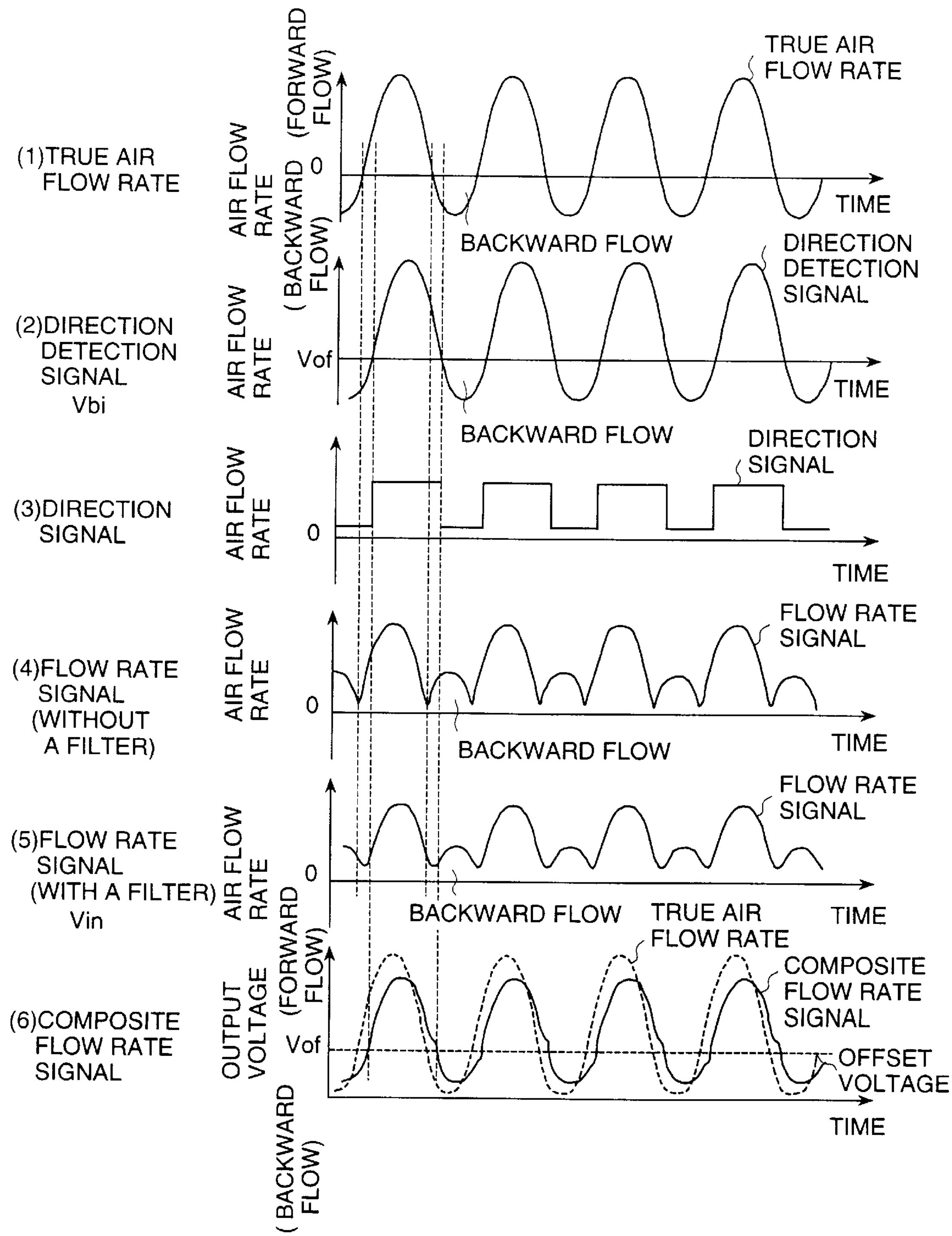
FIG. 8 shows operating waveforms showing the first embodiment according to the present invention.

FIG. 8 shows detailed operating waveforms. In the case the true air flow (1) signal is a pulsating waveform containing the backward flow from the engine 1, the direction detection signal Vbi(2) has a phase difference due to a thermal response delay. The direction signal (3) can be obtained by discriminating the direction detection signal Vbi(2) at a preset level Vof.

As the direction detection signal Vbi(2) is basically very low to be sensed, it must be amplified greatly in the direction detection circuit 2130. Consequently, the direction detection signal Vbi(2) is apt to be affected by drifts of the arithmetic amplifier or the like.

To solve this problem, it is recommendable to use the output of the zero span circuit which has a high flow-rate sensitivity and a wide dynamic range. Otherwise, the flow-rate signal (4) has a little delay in response to the direction detection signal Vbi. At the same time, this construction cannot detect the direction of the air flow, the signal for the backward flows is also positive. Here, the above stated phase delay circuit adjusts the phases to get a phase-matched flow rate signal (5). Finally, the micro-processor 220 internally processes the signal to give a sign to the flow rate signal (5) according to the direction signal. With this, a correct flow-rate signal (6) can be obtained.

The use of the above stated air flow meter 20 which can detect the flow direction facilitates diagnosing of the operating status of the valve mechanism. Although this embodiment according to the present invention is one of means to measure the quantity of a backward flow and a flow direction, its construction is comparatively simple and of a low cost.

Figure 9:
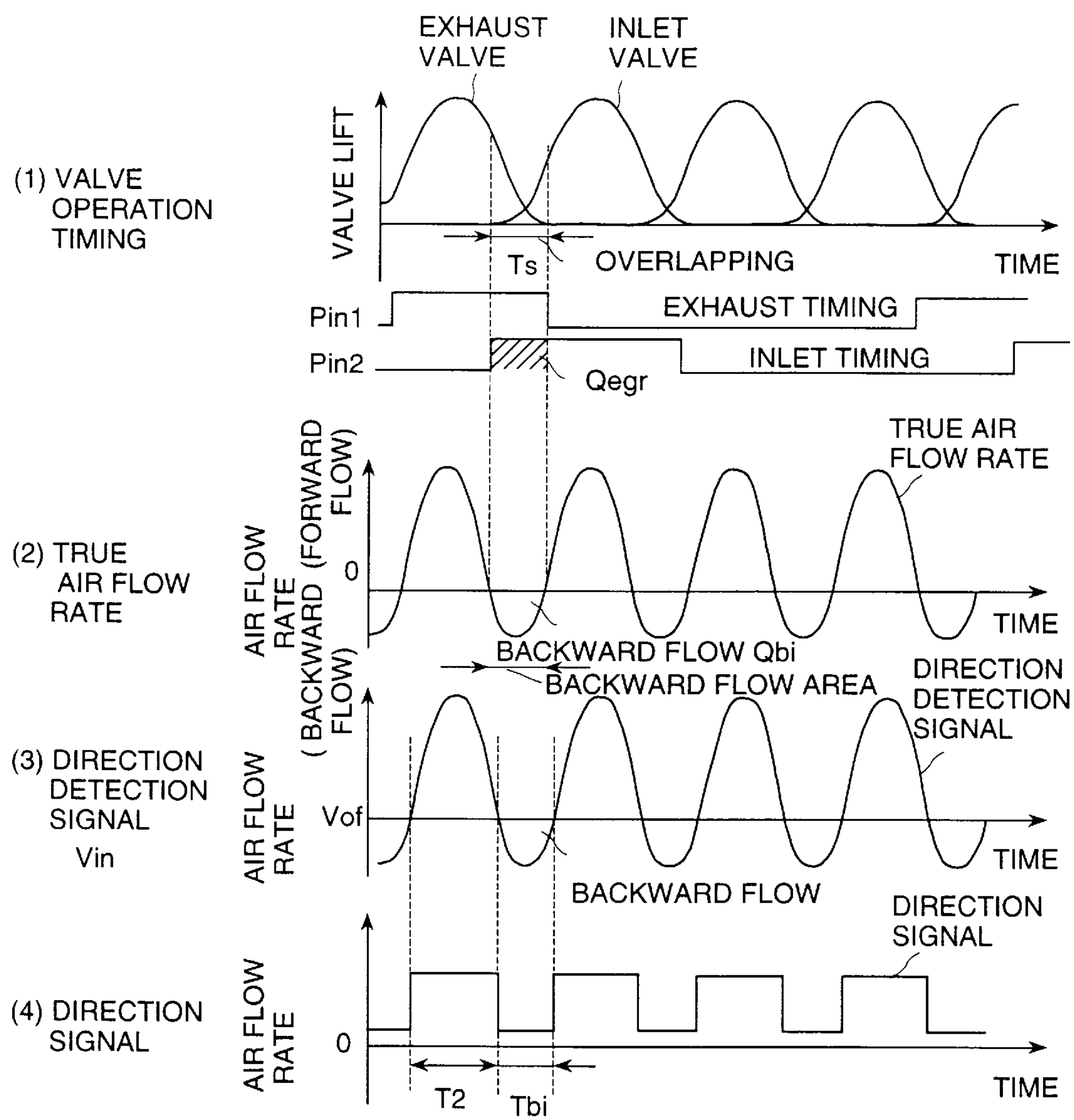
FIG. 9 shows operating waveforms showing during an overlap of the variable valve of the first embodiment according to the present invention when the intake valve and the exhaust valve are open at a time for a preset time period.

Referring to FIG. 9, one internal combustion engine diagnosing example according to the present invention will be explained below. FIG. 9 assumes that a timing Pin1 of the exhaust signal and a timing Pin2 of the intake signal of the variable valve mechanism overlap with each other. The valve timing (1) shows the quantity of the valve lift of each of the intake valve 10 and the exhaust valve 11 and the valve timings of each of the intake valve and the exhaust valve.

The exhaust valve and the intake valve are open at a time for a preset time overlap period according to a timing signal. The actual (true) air flow rate (2) contains the backward flow corresponding to this overlap quantity. The quantity of this overlap is obtained from the overlap time and the internal EGR quantity Qegr in the intake/exhaust gas.

In the above stated embodiment according to the present invention, the direction signal (4) and the forward/backward flow cycles can be measured by discriminating the backward flow range of the direction detection signal Vbi(3) with a preset level Vof. Further the quantity of backward flow Qbi can be obtained using the forward/backward flow cycles and the flow rate signal Vin.

Figure 10:
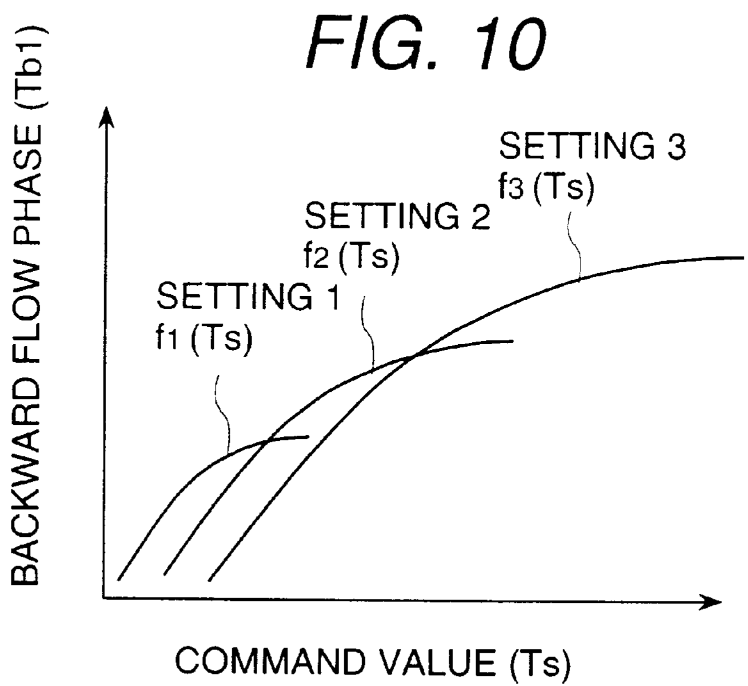
FIG. 10 is a graph showing a relationship between backward flow phases and overlap command values of one embodiment according to the present invention.

FIG. 10 shows a graph showing the relationship between backward flow phases Tbi and overlap time periods Ts as the command values, which are a predicted result of measurement. The backward flow phase Tbi becomes greater as the overlap time period Ts increases. However, this is dependent upon a condition which is set as the command value.

For example, the signal varies according to the speed of the engine 1. Herein, setting 1 is for slow engine speed, setting 2 is for middle engine speed, and setting 3 is for high engine speed. The relationship between the assumed output values and the command values is stored as reference values as the sensor characteristics under respective setting conditions. The actually detected values are compared by these stored values to judge whether the variable valve mechanism is in the normal operating status.

Figure 11:
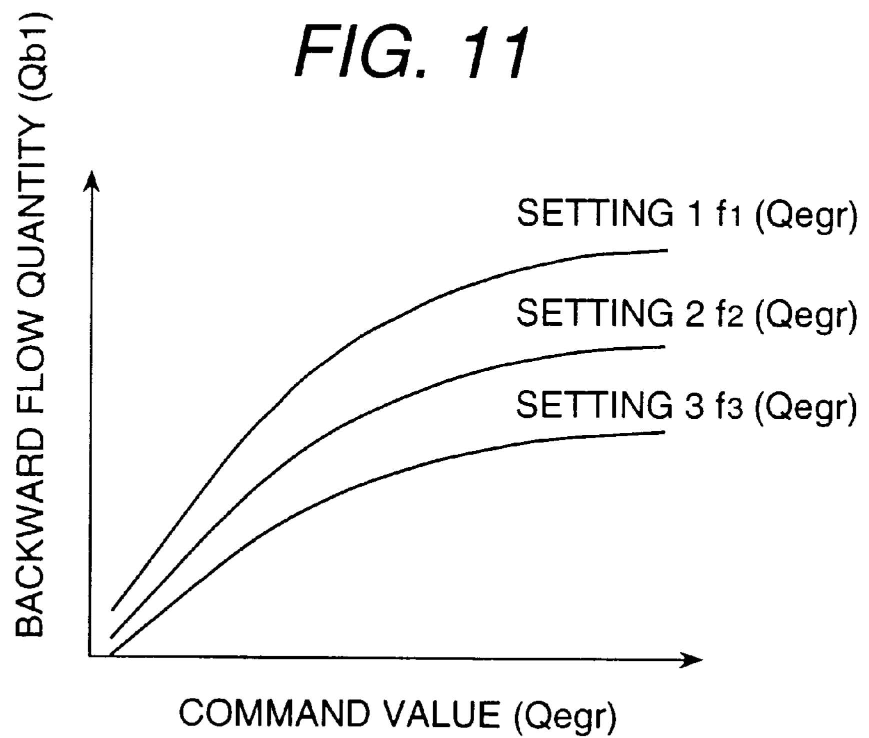
FIG. 11 is a graph showing a relationship between backward flow rates and overlap command values of one embodiment according to the present invention.

FIG. 11 shows a graph showing the relationship between the quantity of backward flow Qbi when the backward flow occurs and the internal EGR quantity Qegr of the intake valve 10 and the exhaust valve 11 which are open at the same time as the command values, which is a predicted result of measurement. The quantity of backward flow Qbi becomes greater as the command value Qegr (target EGR quantity) increases. However, this is dependent upon a condition which is set as the command value.

Figure 12:
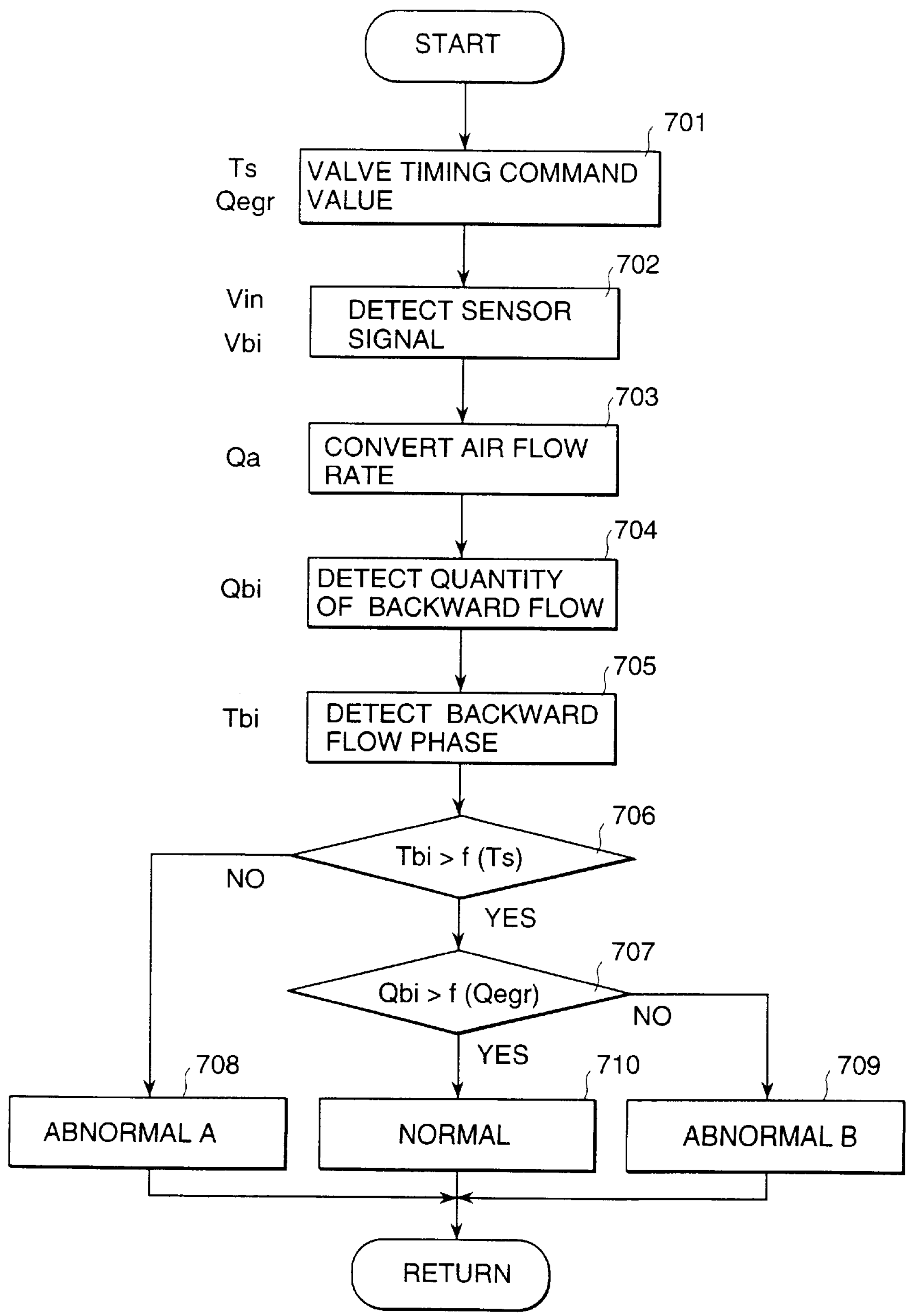
FIG. 12 is an algorithm for diagnosing showing the variable valve mechanism of the first embodiment according to the present invention.

For example, the signal varies according to the speed of the engine 1. Herein, setting 1 is for slow engine speed, setting 2 is for middle engine speed, and setting 3 is for high engine speed. The relationship between the assumed output values and the command values is stored as reference values as the sensor characteristics under respective setting conditions. The actually detected values are compared by these stored values to judge whether the variable valve mechanism is in the normal operating status. FIG. 12 shows this operation flow for diagnosing the operation only.

The engine diagnosis apparatus receives command values Ts and Qegr by a valve timing command value (701), gets outputs Vbi and Vin from the sensor signal detector 702, converts the outputs into a flow rate Qa by the air flow rate converter 703 according to the internally defined voltage vs flow rate conversion map, detects the quantity of backward flow Qbi (704) from the direction signal when the backward flow occurs, gets the backward flow phase Tbi from the backward flow phase detector 705, and compares (706) the backward flow phase Tbi by the target map value under the setting condition of the command value Ts.

If the backward flow phase value is, for example, smaller than the target value, the engine diagnosis result "abnormal A" (708) (backward flow phase error) is posted. When the backward flow phase Tbi is within the target value, the engine diagnosis apparatus compares the quantity of backward flow Qbi by the target map value under the setting condition of the command value Qegr. If the quantity of backward flow Qbi is smaller than the target map value, the engine diagnosis result "Abnormal B" (708) (backward flow quantity error) is posted.

When the quantity of backward flow Qbi is satisfactory within the target value, the engine diagnosis apparatus ends the diagnosis processing. This operation flow enables exquisite diagnoses of the internal combustion engine 1 such as diagnosing for the backward flow phase error only and the detection of no backward flow quantity in the presence of the backward flow phase.

As explained above, the engine diagnosis apparatus of the first embodiment according to the present invention using the means for measuring command value signals to control intake/exhaust valve open periods and the flow rate of air flowing through the intake manifold of the engine 1 together with the direction of air flow can facilitate the diagnosis of the operating status of the valve mechanism of the engine diagnosis apparatus.

The air flow meter 20 which receives the command signal to control the opening time of the exhaust valve or the intake valve enables both measurement of an air flow rate and the diagnosis of the variable valve mechanism. It is possible to forcibly set a low output level or a high output level to indicate an abnormal status of the valve mechanism, but it is possible to provide a communication function to send both the measured air flow rate and the result of diagnosis. This engine diagnosis apparatus of this embodiment according to the present invention has merits of enabling diagnosis of the variable valve mechanism without any extra sensor and reducing the load of the engine control unit.

Figure 13:
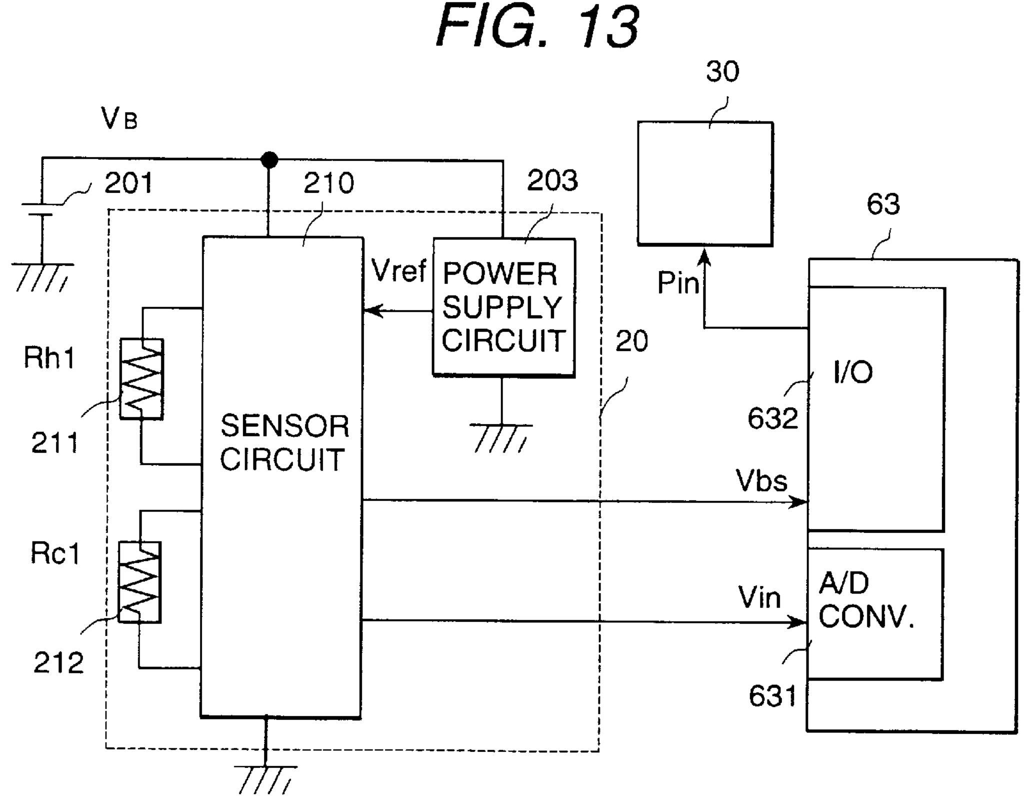
FIG. 13 is a functional block diagram showing a sensor system of a second embodiment according to the present invention.

Below will be explained an apparatus of diagnosing an internal combustion engine and a method of diagnosing an internal combustion engine of a second embodiment according to the present invention referring to FIG. 13. The air flow meter 20 of this embodiment according to the present invention does not have a function to diagnose the operating status of the variable valve mechanism.

The sensor circuit connected to a power supply 201 heats a heating resistor 211 to keep it at a preset temperature and measures the flow rate of air flowing over the heating resistor 211 by sensing the quantity of heat deprived from the heating resistor 211. This sensor circuit together with the power supply circuit 203 constitutes the air flow meter 20.

The engine control unit 63 receives a signal Vin from the air flow meter 20, converts it into a digital value by the analog-to-digital converter 631 and uses the result for engine control. At the same time, the engine control unit 63 sends a control signal from the I/O terminal (I/O) 662 to the variable valve controlling means 30 and simultaneously receives a pulse like direction signal Vbs proportional to the flow direction from the air flow meter 20.

Figure 14:
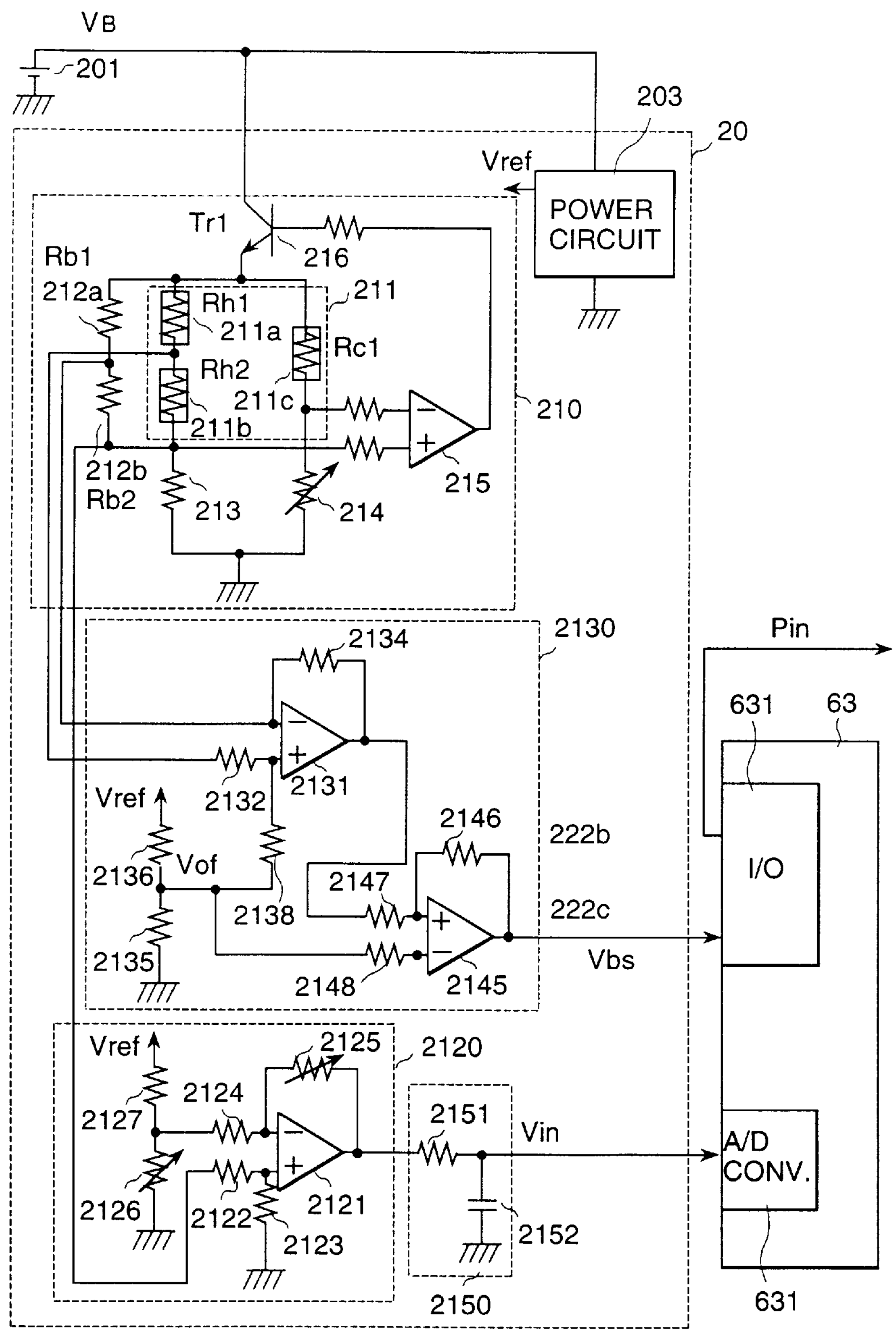
FIG. 14 is a circuit diagram showing the air flow meter device which is the second embodiment according to the present invention.

Below will be explained the detailed construction of hardware of the engine diagnosis apparatus of the embodiment according to the present invention referring to FIG. 14. The sensor circuit 210 connected to the power supply 201 outputs a signal proportional to an air flow rate. The sensor circuit 210 is comprised of a Wheatstone bridge having heating resistors 211*a* and 211*b*, a temperature compensating resistor 211*c*, and resistors 213 and 214, a differential amplifier 215, and a transistor 216.

The current flowing through the heating resistors 211*a* and 211*b* is controlled by the differential amplifier 215 and the transistor 216 so that the potential difference at the center of the bridge may be zero. This construction controls to keep the resistances of the resistors 211*a* and 211*b* constant, namely to keep the resistors 211*a* and 211*b* at a preset temperature.

A signal indicating an air flow rate which is determined by the heating resistors 211*a* and 211*b* is fed to a zero-span circuit 2120 which is comprised of a differential amplifier 2121, and resistors 2122, 2123, 2124, 2125, 2126, and 2127. The zero point and the span can be adjusted for example by the resistance trimming the resistors 2125 and 2126.

A pulse like direction signal Vbs can be obtained by amplifying a signal from the bridge circuit comprising of resistors 212*a* and 212*b* and heating resistors 211*a* and 211*b* which are placed in parallel with the flow of the air by the differential amplifier 2131 and resistors 2132, 2134, 2135, 2136, and 2138 and processing the result by a comparator 2145, and resistors 2147, 2148, and 2146.

The above stated heating resistors 211*a* and 211*b* are made of a thin heat generating film or a thick heat generating film of a compound of metal such as platinum, nickel, or tungsten or a poly-silicone resistor on a substrate such as a glass, ceramic, or silicone plate.

For the use of some kinds of heating resistors, there may be a phase difference between the direction signal Vbi and the output of the zero-span circuit 2120 due to a thermal response delay when the air flow changes its direction. A voltage output Vin without a phase difference can be obtained for example by adding a phase delay circuit 2150 comprising of a resistor 2151 and a capacitor 2152. This example uses a primary filter as a phase delay circuit, but it is possible to make a phase delay by adding a capacitor in parallel to the resistor 2125 of the zero-span circuit 2120.

The above stated heating resistors 211*a* and 211*b* are provided in the intake manifold of an internal combustion engine 1 of a vehicle or the like and outputs a voltage proportional to the flow rate of air moving or air flowing through the intake air passage in the form of a voltage output Vin of a differential amplifier 2121.

This output voltage Vin is fed to an analog-to-digital converter 631 built in the engine control unit 63, converted into a digital signal, and operated into an air flow rate by the CPU 222 in the engine control unit 63 according to the output-voltage vs air flow rate formula. The result is used for various controlling.

The engine diagnosis apparatus of this embodiment according to the present invention diagnoses the operating status of the variable valve mechanism by using the pulse like direction signal Vbs and the voltage output Vin independent of the air flow. In other words, the variable valve mechanism can be diagnosed by the engine control unit 63 without any extra diagnosing processor.

Figure 15:
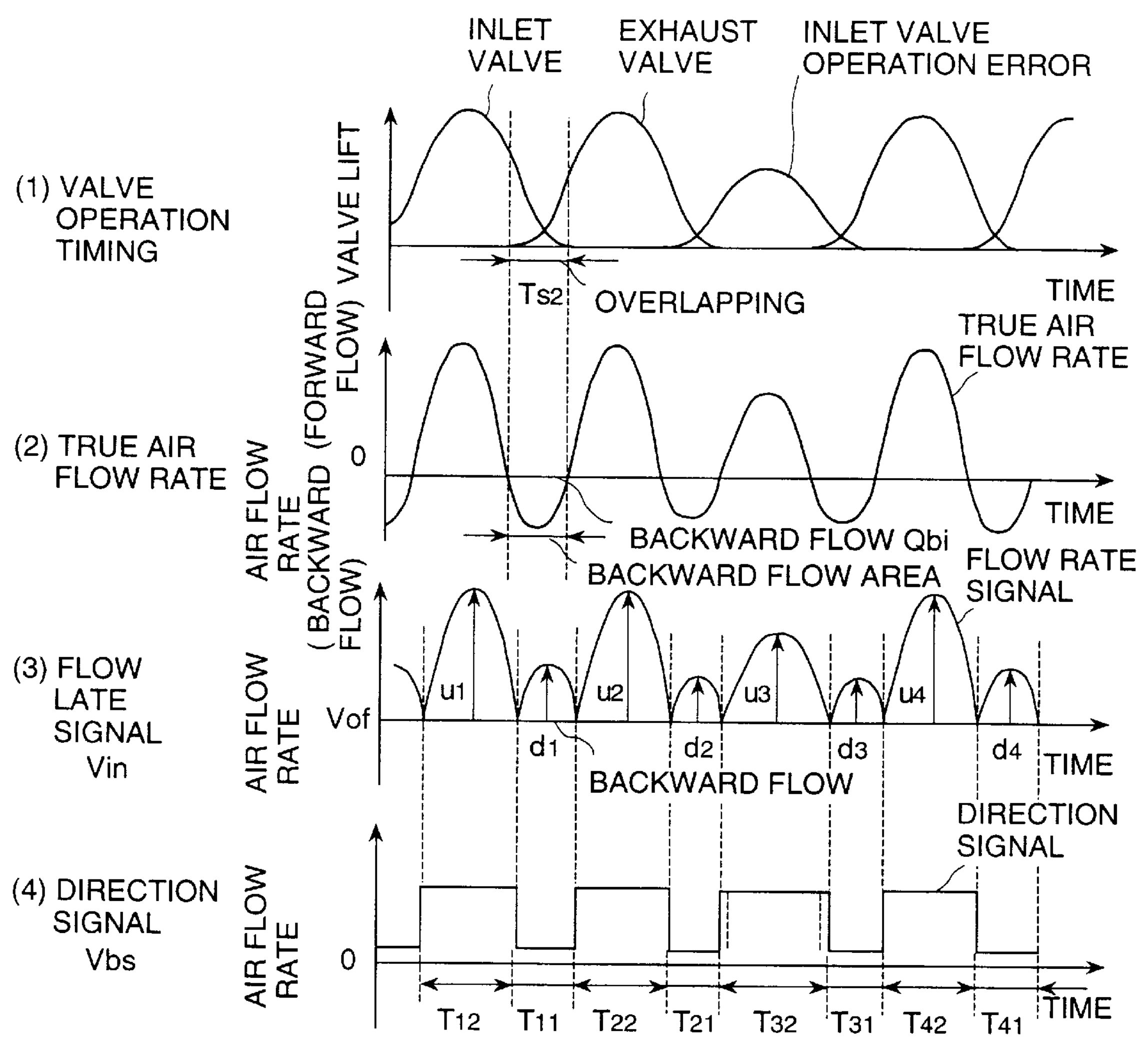
FIG. 15 shows operating waveforms of during an overlap of the variable valve of the second embodiment according to the present invention when the intake valve and the exhaust valve are open at a time for a preset time period.

Below will be explained how a trouble on one of variable valves of a multi-cylinder engine is diagnosed for, referring to FIG. 15. In the valve timing (1), if one of the cylinders has a valve trouble, the air flow rate or the backward flow range in the actual (true) flow rate (2) may be less than that in the normal valve operation. When measured by the air flow meter which can detect a flow direction, this reduction is represented with a lower peak in the flow rate signal Vin (3) before and after the cylinder that caused the trouble.

The micro-processor 220 internally compares the peak value of the troubled cylinder by the peak value of each cylinder to judge the difference (the displace amount). Further, the valve trouble can also be detected by a ratio of a forward flow direction range by a backward flow direction range in the direction signal (4) because differences are frequently found before and after the troubled cylinder.

Figure 16:
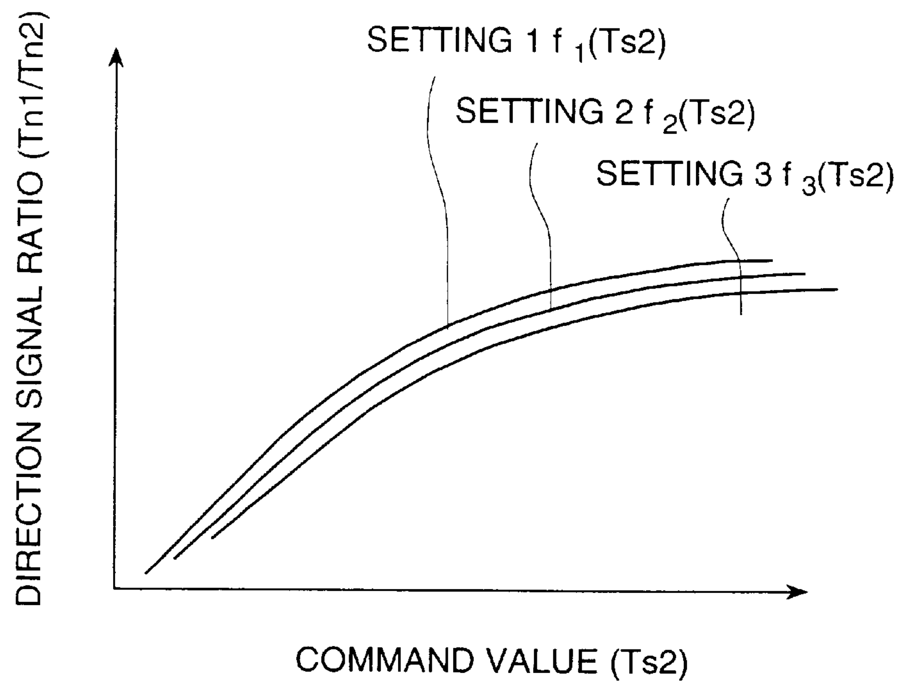
FIG. 16 is a graph showing a relationship between direction signal ratios and overlap command values in accordance with the second embodiment according to the present invention.

FIG. 16 shows a graph showing the relationship between the direction signal ratio Tn1/Tn2 and the overlap time Ts2 as the command value, which is a predicted result of measurement. The direction signal ratio Tn1/Tn2 becomes greater as the overlap time period Ts increases. Due to the direction signal ratios, the value fluctuation by conditions set as the command values is very little.

The relationship between the assumed output values and the command values is stored as the reference values as the sensor characteristics under respective setting conditions. The actually detected values are compared by these stored values to judge whether the variable valve mechanism is in the normal operating status. It is also possible to use a crank angle signal to specify a troubled cylinder and it is possible to discriminate the trouble cycle.

Figure 17:
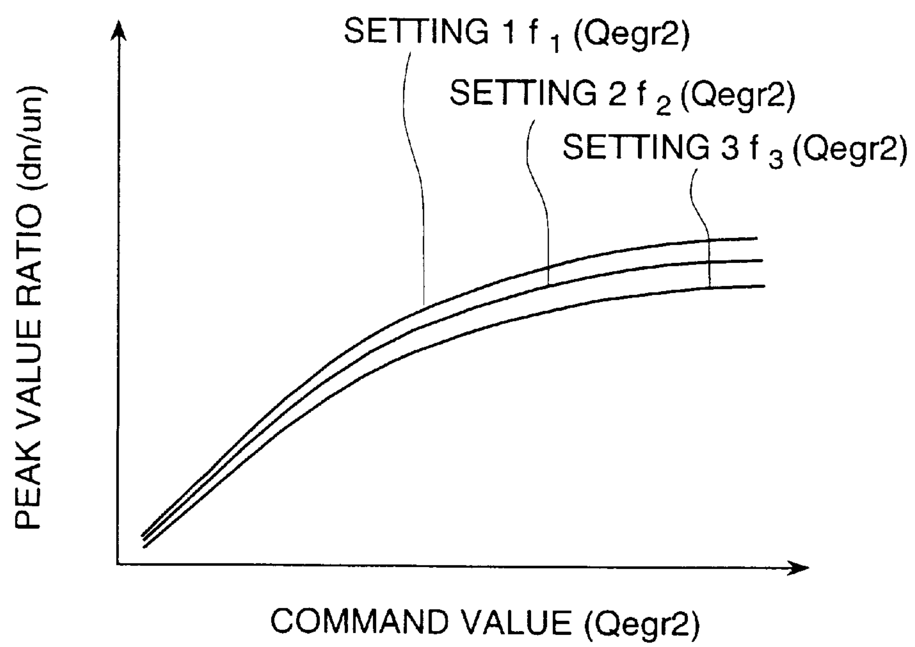
FIG. 17 is a graph showing a relationship between peak value ratios and overlap command values in accordance with the second embodiment according to the present invention.

Similarly, FIG. 17 shows a graph showing the relationship between the ratio dn/un of the forward flow peak value and the backward flow peak value and the quantity Qegr2 of the internal EGR in the intake gas and the exhaust gas during the overlap time as the command value. The peak value ratio dn/un becomes greater as the command value Qegr increases. Due to the peak value ratios, the value fluctuation by conditions set as the command values is very little.

Figure 18:
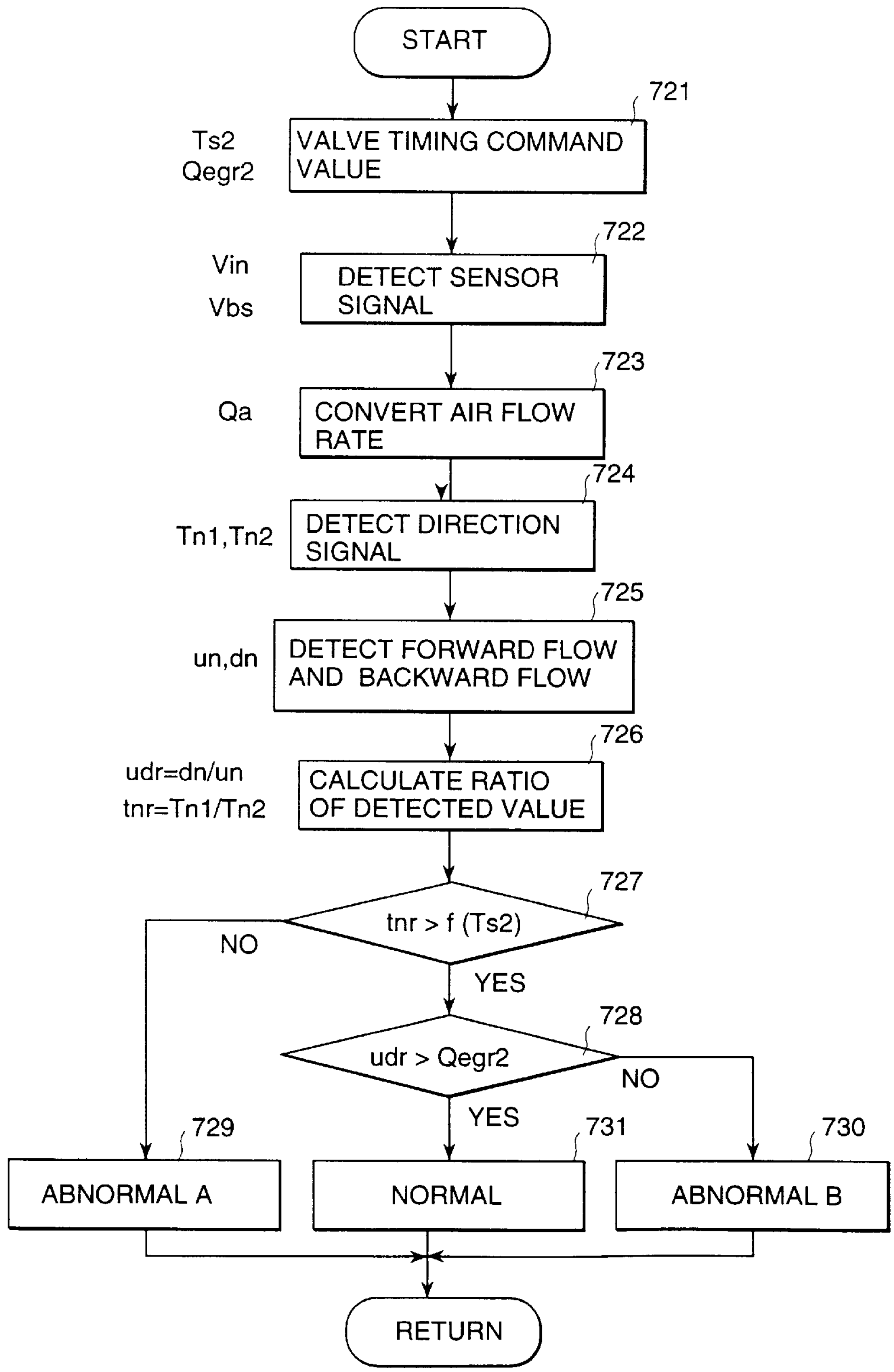
FIG. 18 is an algorithm for diagnosing showing the variable valve mechanism of the second embodiment according to the present invention.

The relationship between the assumed output values and the command values is stored as reference values as the sensor characteristics under respective setting conditions. The actually detected values are compared by these stored values to judge whether the variable valve mechanism is in the normal operating status. FIG. 18 shows this operation flow for diagnosing the operation only.

The engine diagnosis apparatus receives command values Ts2 and Qegr2 by a valve timing command value 721, gets outputs Vin and Vbs from the sensor signal detector 722, converts the outputs into the flow rate Qa by the air flow rate converter 723 according to the internally defined voltage vs flow rate conversion map, and detects direction signals Tn1 and Tn2 by the direction signal detector 724.

Similarly, the engine diagnosis apparatus performs the forward/backward flow detection 725 according to the direction signals and gets the forward flow peak value un and the backward flow peak value dn, and calculates the ratio of detected values un and dn (726) to get a direction signal ratio tnr and a peak value ratio udr.

The engine diagnosis apparatus compares (727) the direction signal ratio tnr by the target map value under the setting condition of the command value Ts2. If the ratio is smaller than the target value, the diagnosis result "Abnormal A" (729) (backward flow phase error) is posted. When the direction signal ratio tnr is within the target value, the engine diagnosis apparatus compares (728) the peak value ratio udr by the target map value under the setting condition of the command value Qegr2.

If the ratio is smaller than the target value, the engine diagnosis result "Abnormal B" (730) (backward flow quantity error) is posted. When the peak value ratio udr is satisfactory within the target value, the engine diagnosis apparatus ends the diagnosis processing.

This operation flow enables exquisite diagnoses of the internal combustion engine 1 such as judging for the backward flow phase error only and the discrimination of a composite trouble of respective cylinders. Particularly, the use of ratios can make the measurement more independent of the influence by the engine speeds and reduce the number of target map values under the set condition, for example to one map value.

With the air flow meter 20 which can detect the air flow direction, the engine control unit 63 can perform judging by a built-in diagnosis software. As the software contains the variable valve driving timing signals and the valve timing command values, the engine diagnosis apparatus requires no additional wiring and alteration, which makes the system more compatible.

There is a problem when the internal combustion engine 1 runs with a lean mixture. Its exhaust gas is rich in oxygen gas and NOx in the exhaust gas cannot be removed by the ordinary three way catalysts. NOx is created in the combustion processes of the engine 1 and increases as the combustion temperature becomes higher. To reduce the NOx gas, the EGR (Exhaust Gas Re-circulation) technology has been widely known which feeds back the exhaust gas into the combustion chamber 3 and reduces the combustion temperature.

There are two EGR ways to feed back the exhaust gas into the combustion chamber 3, which are an external EGR way which bypasses the exhaust gas from the engine 1 to the intake manifold and an internal EGR way which keeps part of the exhaust gas in the combustion chamber 3.

In the EGR technology, it is very significant to mix up the fed-back exhaust gas with a fresh intake. The external EGR technique can mix up the fed-back exhaust gas fully with the fresh intake, but it requires additional bypass conduits and valves to control the quantity of the bypassed exhaust gas, which increases the production cost. On the other hand, the internal EGR technique insufficiently mixes the fed-back exhaust gas with the fresh intake and cannot control the quantity of exhaust gas to be left in the combustion chamber 3.

The exhaust valve 11 starts to open at the crank angle of 75 degrees and lets the exhaust gas go into the exhaust conduit. In this exhaust process, the exhaust valve 11 opens between the crank angle of 95 degrees and the crank angle of 96 degrees to feed the exhaust gas to the intake port 19. The exhaust gas in the intake port 19 is mixed up with the fresh air which is taken in the succeeding intake process.

This gas mixture (EGR gas) and the fresh air are taken into the combustion chamber 3 when the intake valve 10 opens at the crank angle of 85 degrees. The quantity of the EGR gas, can be controlled by an intake signal P2 given to the intake valve 10 which opens in the exhaust process.

As the engine diagnosis apparatus of this embodiment according to the present invention employs the internal EGR technology, it requires no additional parts such as bypass conduits and valves, which reduces the production cost. Further, this embodiment with the variable valve mechanism according to the present invention can easily control the quantity of the internal EGR gas.

The engine diagnosis apparatus and the engine diagnosis method in accordance with the present invention uses signals to drive electromagnetic means built in the variable valve mechanism and the air flow meter which can detect the direction of air flow. With this, the engine diagnosis apparatus and the engine diagnosis method can sequentially diagnose the operating status of the variable valve mechanism of the engine and thus increases the safety of the engine system.

What we claim is:

1. An apparatus of diagnosing an internal combustion engine having a variable valve mechanism and in which an intake valve or an exhaust valve sequentially opens and closes each of a plurality of cylinders of said internal combustion engine by electric signals, comprising an input means for indicating an operating condition of the variable valve mechanism, and an air flow meter based upon operational differences among the cylinders operatively associated with said input means and configured to directly detect a fluctuation of backward flow as an amount of mass air flow to diagnose an abnormality in said variable valve mechanism and a control apparatus of said variable valve mechanism is in accordance with said quantity of the backward flow which flows into an intake manifold of the internal combustion engine and with an overlap open time period when neither the intake valve of the exhaust valve are closed.

2. An apparatus of diagnosing an internal combustion engine accordance to claim 1, wherein the internal combustion engine diagnosis apparatus further comprises a memory means for storing a relationship of said quantity of the backward flow which flows into said intake manifold of the internal combustion engine, said overlap open time periods between said intake valve and said exhaust valve, and said abnormality condition.

3. An apparatus of diagnosing an internal combustion engine according to claim 1 wherein said backward flow quantity is a mass of a backward flowing air (Qbi) which is measured by a thermal type air flow meter provided in said intake manifold of the internal combustion engine, a backward flow time period (Tbi), and a ratio (Tn1/Tn2) of a forward flow time period (Tn1) to a backward flow time period (Tn2).

4. An apparatus of diagnosing an internal combustion engine according to claim 1, wherein said backward flow quantity is a mass of a backward flowing air which is measured by a thermal type air flow meter provided in said intake manifold of the internal combustion engine, a backward flow time period, and a ratio of a peak forward flow air mass to a peak backward flow air mass.

5. An apparatus of diagnosing an internal combustion engine having a variable valve mechanism and in which an intake valve or an exhaust valve sequentially opens and closes each of a plurality of cylinders of said internal combustion engine by electric signals, comprising an input means for indicating an operating condition of the variable valve mechanism, and an air flow meter operatively associated with said input means and configured to directly detect a quantity of backward flow as an amount of mass air flow to diagnose an abnormality of said variable valve mechanism and a control apparatus of said variable valve mechanism in accordance with said quantity of the backward flow which flows into an intake manifold of the internal combustion engine and with a preset target EGR quantity of the internal combustion engine.

6. An apparatus of diagnosing an internal combustion engine accordance to claim 5, wherein the internal combustion engine diagnosis apparatus further comprises a memory means for storing a relationship of said quantity of the backward flow which flows into said intake manifold of the internal combustion engine, said preset target EGR quantity of the internal combustion engine, and said abnormality condition.

7. An apparatus of diagnosing an internal combustion engine having a variable valve mechanism and in which an intake valve or an exhaust valve sequentially opens and closes each of a plurality of cylinders of said internal combustion engine by electric signals, comprising an input means for indicating an operating condition of the variable valve mechanism, and an air flow meter operatively associated with said input means and configured to directly detect a quantity of backward flow as an amount of mass air flow to diagnose an abnormality in said variable valve mechanism and a control apparatus of said variable valve mechanism is diagnosed in accordance with said quantity of the backward flow which flows into an intake manifold of the internal combustion engine, with an overlap open time period when neither the intake valve or the exhaust valve are closed, and with a rotational speed of the internal combustion engine.

8. An apparatus of diagnosing an internal combustion engine accordance to claim 7, wherein the internal combustion engine diagnosis apparatus further comprises a memory means for storing a relationship of said quantity of the backward flow which flows into said intake manifold of the internal combustion engine, said overlap open time periods between said intake valve and said exhaust valve, said rotational speed of the internal combustion engine, and said abnormality condition.

9. A method of diagnosing an internal combustion engine having a variable valve mechanism and in which an intake valve or an exhaust valve sequentially opens and closes each of a plurality of cylinders of the internal combustion engine by electric signals, comprising inputting a signal indicative of an operating condition of said variable valve mechanism, diagnosing an abnormality arising from operational differences among the cylinders in accordance with an overlap open time period when neither the intake valve or exhaust valve are closed and a backward flow time period of an intake manifold of the internal combustion engine;

measuring a mass of backward flow air directly with an air flow meter as a mass flow amount as an indication of the abnormality arising from operational differences among the cylinder;

and diagnosing another abnormality in accordance with a target EGR quantity of the internal combustion engine and said mass of the backward flow air in said intake manifold of the internal combustion engine.

10. A method of diagnosing an internal combustion engine according to claim 9, wherein said first step diagnoses said abnormality in accordance with said rotational speed of the internal combustion engine.

11. A method of diagnosing an internal combustion engine according to claim 9, wherein said second step diagnoses said abnormality in accordance with said rotational speed of the internal combustion engine.

12. A method of diagnosing an internal combustion engine having a variable valve mechanism and in which an intake valve or an exhaust valve sequentially opens and closes each of a plurality of cylinders of the internal combustion engine by electric signals, comprising inputting a signal indicative of an operating condition of said variable valve mechanism, diagnosing an abnormality arising from operational differences among the cylinders in accordance with an overlap open time period when neither the intake valve or the exhaust valve are closed, and a ratio of a forward air flow time period to a backward flow time period of said intake manifold of the internal combustion engine;

measuring a backward flow air mass directly with an air flow meter as an indication of the diagnosed abnormality; and diagnosing another abnormality in accordance with a target EGR quantity of the internal combustion engine and a ratio of a peak forward flow air mass to a peak of said backward flow air mass.

* * * * *